3 Sheets—Sheet 1.

T. G. SAINT.

CLOTHES DRIER.

No. 9,805.

Reissued July 12, 1881.

Witnesses.
W. W. Mortimer
W. H. Kern

Inventor:
Thos. G. Saint,
per
F. A. Lehmann,
Atty.

N. PETERS, Photo-Lithographer, Washington, D. C.

T. G. SAINT.

CLOTHES DRIER.

No. 9,805. Reissued July 12, 1881.

Witnesses.

W. W. Mortimer.

W. H. Kern

Inventor

Thos. G. Saint per

F. A. Lehmann,

Att'y.

N. PETERS, Photo-Lithographer, Washington, D. C.

T. G. SAINT.

CLOTHES DRIER.

No. 9,805. Reissued July 12, 1881.

Witnesses.

W. H. Mortimer.

W. H. Kern

Inventor.

Thos. G. Saint, per

F. A. Lehmann,

Atty.

N. PETERS, Photo-Lithographer, Washington, D. C.

UNITED STATES PATENT OFFICE.

THOMAS G. SAINT, OF SHARPSBURG, PENNSYLVANIA.

CLOTHES-DRIER.

SPECIFICATION forming part of Reissued Letters Patent No. 9,805, dated July 12, 1881.

Original No. 170,495, dated November 30, 1875. Application for reissue filed May 2, 1881.

*To all whom it may concern:*

Be it known that I, THOMAS G. SAINT, a citizen of the United States, residing at Sharpsburg, in the county of Allegheny and State of Pennsylvania, have invented certain new and useful Improvements in Clothes-Driers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in clothes-driers; and it consists, first, in the combination of two rings provided with lips or flanges, and which are passed over the posts and secured thereto in such relation to each other that the coupling-ring is loosely held between them; second, in the combination of the posts, which are arranged in groups, with the two sets of arms of unequal length, which unite them together, the longer set of arms being made to cross each other, for the purpose hereinafter set forth.

The object of my invention has been to provide a cheap, simple, and effective coupling for uniting the posts and arms together, and to so connect the arms and posts that there will be but little liability of the drier upsetting while in use.

Figure 1:
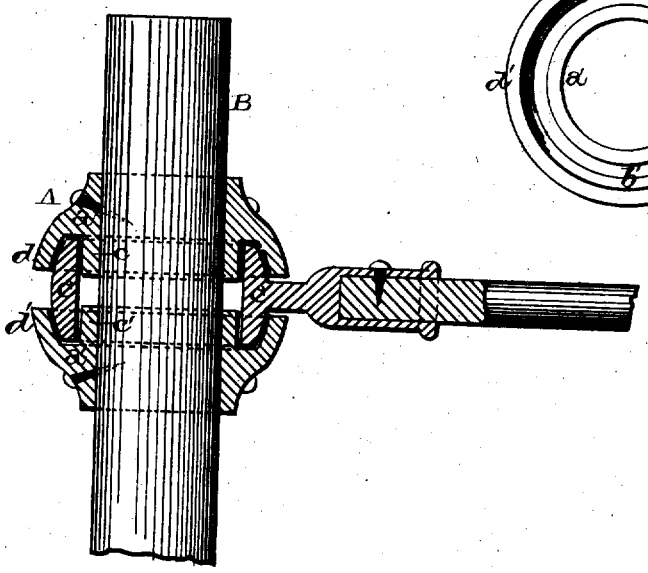
Figure 2:
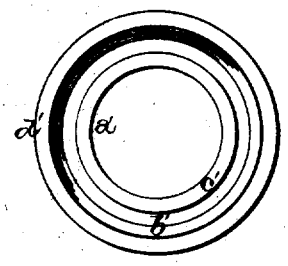
Figure 3:
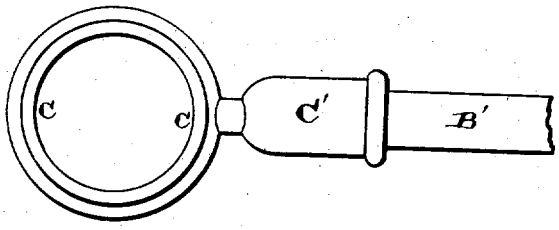
Figure 4:
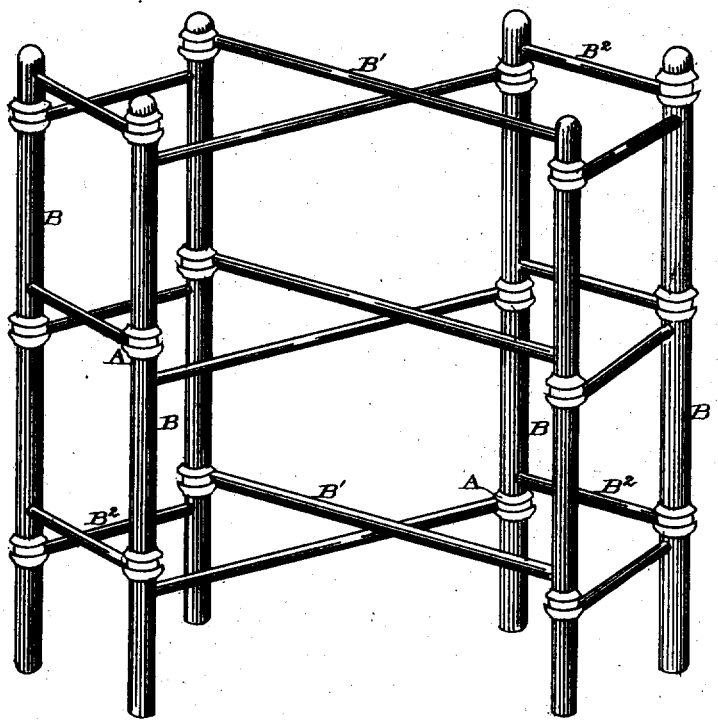
Figure 5:
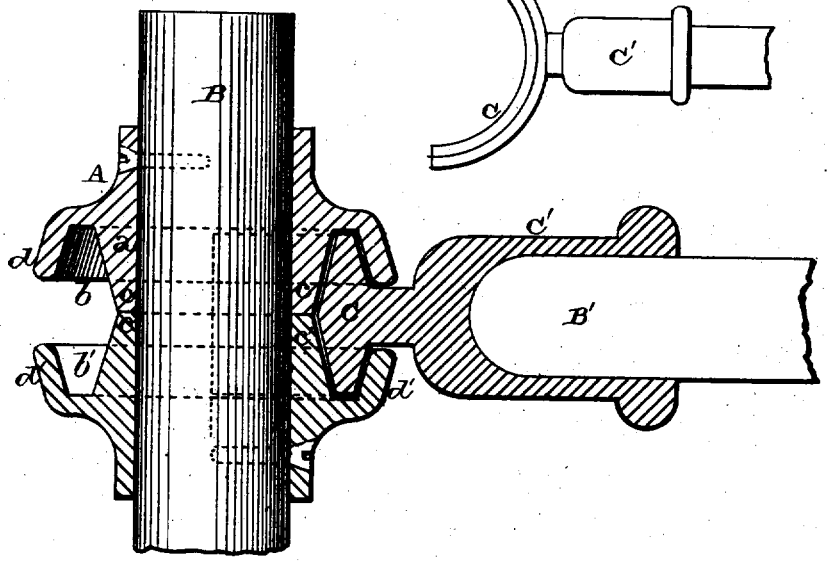
Figure 6:
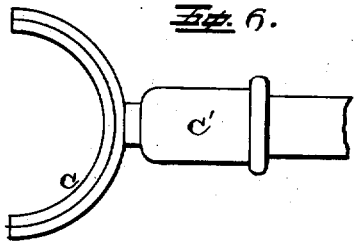

Figure 1 is an enlarged vertical section of the hinge attached to the post. Fig. 2 is an enlarged plan view of one of the rings of the hinge by itself. Fig. 3 is a plan view of one of the couplings detached. Fig. 4 is a perspective of the drier complete. Fig. 5 is an enlarged vertical section of one of the couplings. Fig. 6 is an enlarged detail view of a portion of the ring C.

A represents the coupling-hinges; B, the vertical posts; B′ B², the two sets of coupling-arms, of unequal lengths, and which unite the posts together. The longer set of arms, B′, are made to cross each other, so that the drier cannot be opened too wide. By the use of the long arms in connection with the short ones, and by crossing and attaching the long arms to the posts B, as shown, the device is divided into two groups of posts and arms without employing the additional post and set of couplings that would be required were the arms all of equal length. This construction also allows the drier to be extended and arranged in a variety of different positions and forms, as convenience and the space in which it is to be used may require.

Passed over each of the posts are a number of rings, *a a′*, which are divided into pairs and secured to the posts in the relation to each other, as shown. Each one of these rings has a flange, *d* or *d′*, formed around the outer edge of the inner side, and a second flange, *c* or *c′*, formed at its inner edge, in direct contact with the sides of the post. Between these flanges *d c* or *d′ c′* is formed a recess, *b* or *b′*, of suitable shape and depth, and in these two recesses, in between the two rings, the coupling C is made to catch. Each one of the rings C has a flange formed upon its top and bottom, and these flanges correspond in shape and width to the recesses in the two rings *a a′*, made to receive them. As the two rings *a a′* are secured rigidly to the post, one above and the other below the ring C, it is evident that the ring can neither move up nor down upon the post; but as the rings *a a′* do not clamp the ring C tightly between them the ring C can turn freely around upon the post. Each one of the rings C has a socket, C′, formed upon its outer side to receive the end of one of the arms B′ B².

In Fig. 1 the two rings *a a′* are shown as separated from each other; but in Fig. 5 the two flanges *c c′* are in direct contact with each other; and instead of a whole ring, C, as shown in Fig. 3, a half-ring is formed on the inner end of the socket C′, and this half-ring catches between the two rings *a a′*, and acts in the same manner and for the same purpose as the ring C. The inner flanges, *c c′*, serve to give the rings a firm bearing upon the posts, and to prevent the rings C from coming in contact with the posts and wearing them away as the drier is being opened and closed. The cups or recesses *b b′* fit snugly over the rings C, so that while the rings can turn freely around the arms can have no vertical play whatever.

Having thus fully described my invention, what I claim as new, and desire to secure by Letters Patent, is—

1. In a clothes-drier, the combination of the two rings *a a'*, passed over the post or upright, and secured thereto in the relation shown, each ring having the lips, flanges, or projections *c d* or *c' d'*, with the ring C, which is placed between them, substantially as shown.

2. In a clothes-drier, the posts B, arranged together in groups, and connected by the arms B' $B^2$, of unequal length, the arms B' being made to cross each other, and being coupled to the posts, substantially as set forth.

In testimony that I claim the foregoing as my own I herewith affix my signature in presence of two witnesses.

THOMAS G. SAINT.

Witnesses:

PH. P. JAGEMAN,

T. F. LEHMANN.